(12) United States Patent
Ishii

(10) Patent No.: US 8,024,814 B2
(45) Date of Patent: Sep. 20, 2011

(54) INFORMATION DISPLAY DEVICE

(75) Inventor: Nobutake Ishii, hino (JP)

(73) Assignee: Seiko Epson Corporation (JP)

( * ) Notice: Subject to any disclaimer, the term of this patent is extended or adjusted under 35 U.S.C. 154(b) by 1033 days.

(21) Appl. No.: 11/595,140

(22) Filed: Nov. 9, 2006

(65) Prior Publication Data
US 2007/0113112 A1    May 17, 2007

(30) Foreign Application Priority Data

Nov. 11, 2005   (JP) ................................. 2005-327157

(51) Int. Cl.
*G06F 21/00* (2006.01)

(52) U.S. Cl. ................ 726/28; 726/16; 726/17; 726/27; 713/184

(58) Field of Classification Search .......... 725/145–146, 725/41, 43, 29, 37–38, 47, 59; 710/36–37, 710/58–61, 200; 348/844, 718–719, 563, 348/559, 511–512, 178, 156; 726/36
See application file for complete search history.

(56) References Cited

U.S. PATENT DOCUMENTS

| | | | | |
|---|---|---|---|---|
| 4,510,623 A * | 4/1985 | Bonneau et al. | ................ | 725/27 |
| 4,815,032 A | 3/1989 | Fujii | | |
| 4,987,486 A * | 1/1991 | Johnson et al. | ............... | 725/131 |
| 7,019,737 B1 | 3/2006 | Asai et al. | | |
| 2002/0196526 A1 | 12/2002 | Kawai | | |
| 2003/0186681 A1 * | 10/2003 | Gabor | .......................... | 455/411 |
| 2004/0073660 A1 * | 4/2004 | Toomey | ........................ | 709/224 |

FOREIGN PATENT DOCUMENTS

| | | |
|---|---|---|
| JP | 05-324559 | 12/1993 |
| JP | 11-272613 | 10/1999 |
| JP | 2000-330526 | 11/2000 |
| JP | 2002-108267 | 4/2002 |
| JP | 2002-357853 | 12/2002 |
| JP | 2004-134989 | 4/2004 |
| JP | 2005-078390 | 3/2005 |
| WO | WO 2004099951 A1 * | 11/2004 |

OTHER PUBLICATIONS

Machine Translation of JP2000-330526, (40 sheets).*

* cited by examiner

*Primary Examiner* — Minh Dinh
*Assistant Examiner* — Venkat Perungavoor
(74) *Attorney, Agent, or Firm* — Harness, Dickey & Pierce, P.L.C.

(57) ABSTRACT

An information display device allowing a memory property display screen that continuously displays displayed content as it is even when a power supply is shut off to display information includes a user authentication executing section that performs a user authentication every time a predetermined time elapses; and a display screen control section that puts a display state of said memory property display screen into a display state in which perusal of said information becomes difficult when the user authentication fails.

1 Claim, 7 Drawing Sheets

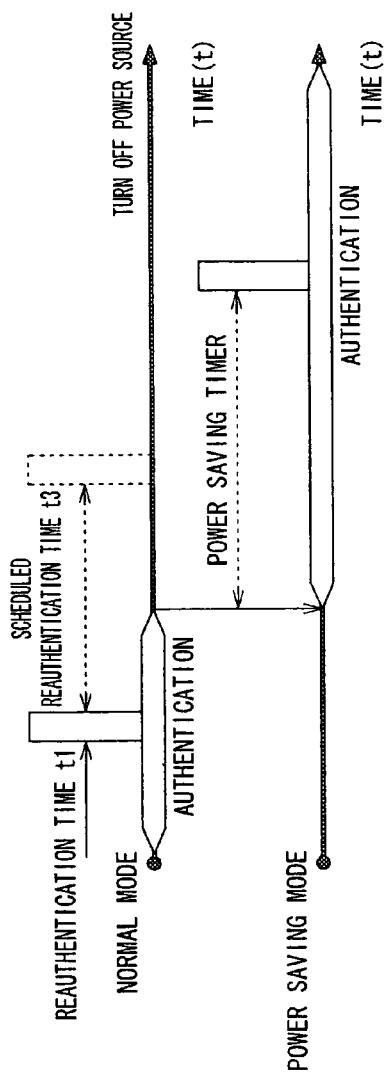
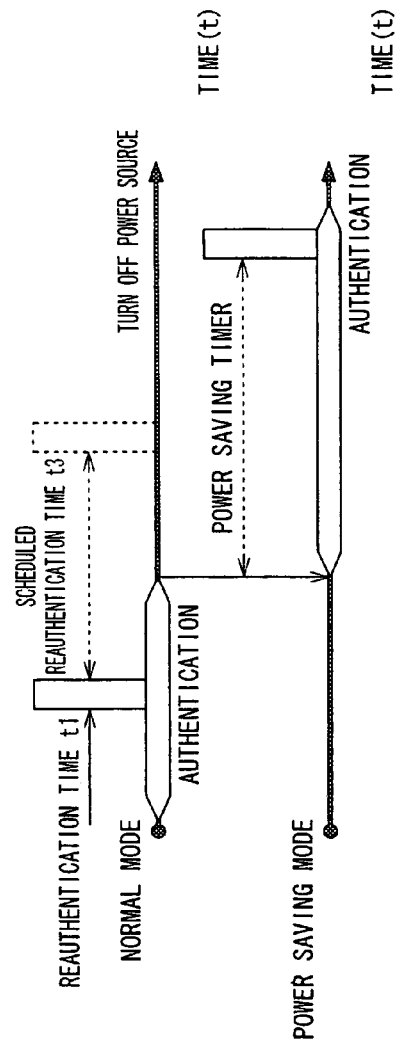

INFORMATION DISPLAY DEVICE

The entire disclosure of Japanese Application No. 2005-327157, filed Nov. 11, 2005, is expressly incorporated by reference herein.

BACKGROUND OF THE INVENTION

1. Field of the Invention

The present invention relates to an information display device that allows a memory property display screen that continuously displays the displayed content as it is even when a power supply is shut off to display information.

2. Description of the Related Art

Heretofore, as the display device of this type, for example, information display device has been known, in which information on document papers, images, and the like is displayed in the memory property display screen such as a cholesteric liquid crystal, an electrophoretic migration type display screen, and the like, and the displayed information is submitted for user perusal (for example, see JP-A-2002-357853).

SUMMARY OF THE INVENTION

However, in the conventional art, information is displayed in a memory property display screen, that is, in the display screen that continues to display the displayed content as it is even if the power supply is shut off, and therefore, there is a fear that the displayed content is perused by others.

An object of the present invention is to solve the above described unsolved problem and a problem of the invention is to provide an information display device capable of preventing the displayed information from being easily perused by others.

To solve the above described problem, the information display device of the present invention is an information display device displaying information in a memory property display screen that continues to display a displayed content as it is even if the power supply is shut off, comprising: user authentication executing section that performs a user authentication every time a predetermined time elapses; and display screen control section that puts a display state of the memory property display screen into a display state in which the perusal of the information becomes difficult when the user authentication fails.

Further, the user authentication executing section, when own device is operated, may perform the user authentication when the predetermined time elapses since own device is operated last time.

Further, the user authentication executing section may extend the predetermined time every time the user authentication succeeds.

Further, the information display device comprises: elapsed time clocking section that clocks on the elapsed time since when the user authentication is performed last time; and power supply shut off section that temporarily shuts off the power supply to own device when rewriting of the displayed content is completed by the memory property display screen, wherein the elapsed time clocking section, when the power supply to own device is restarted, restarts a clocking of the elapsed time from the clocking result when the power supply to own device is shut off, and wherein the user authentication executing section may perform the user authentication when the clocking result by the elapsed time clocking section reaches the predetermined time.

Further, the information display device comprises a power saving timer that clocks on the elapsed time since when the power supply to own device is shut off by the power supply shut off section, wherein the user authentication executing section may perform the user authentication when the clocking result by the power saving timer reaches the predetermined time.

Further, the information display device may comprises an authentication failure time operating section that executes, when the user authentication fails, at least one of:

putting the device into a state in which an operation input to own device is not accepted, and erasing the data of the information.

According to such configuration, in case a person unable to succeed in the user authentication such as the person and the like not permitted to use the information display device peruses the information displayed in the memory property display screen, when the user authentication is performed, the user authentication fails, and the display state of the memory property display screen is put into a display state difficult to peruse. Hence, even when the information is displayed in the memory property display screen, the displayed information can be prevented from being easily perused by others.

BRIEF DESCRIPTION OF THE DRAWINGS

FIGS. 7A and 7B are explanatory drawings for explaining a modified example of the information display device of the present invention.

DETAILED DESCRIPTION OF THE PREFERRED EMBODIMENT

One embodiment of an information display device of the present invention will be described below based on the drawings.

Configuration of Information Display Device

Figure 1:
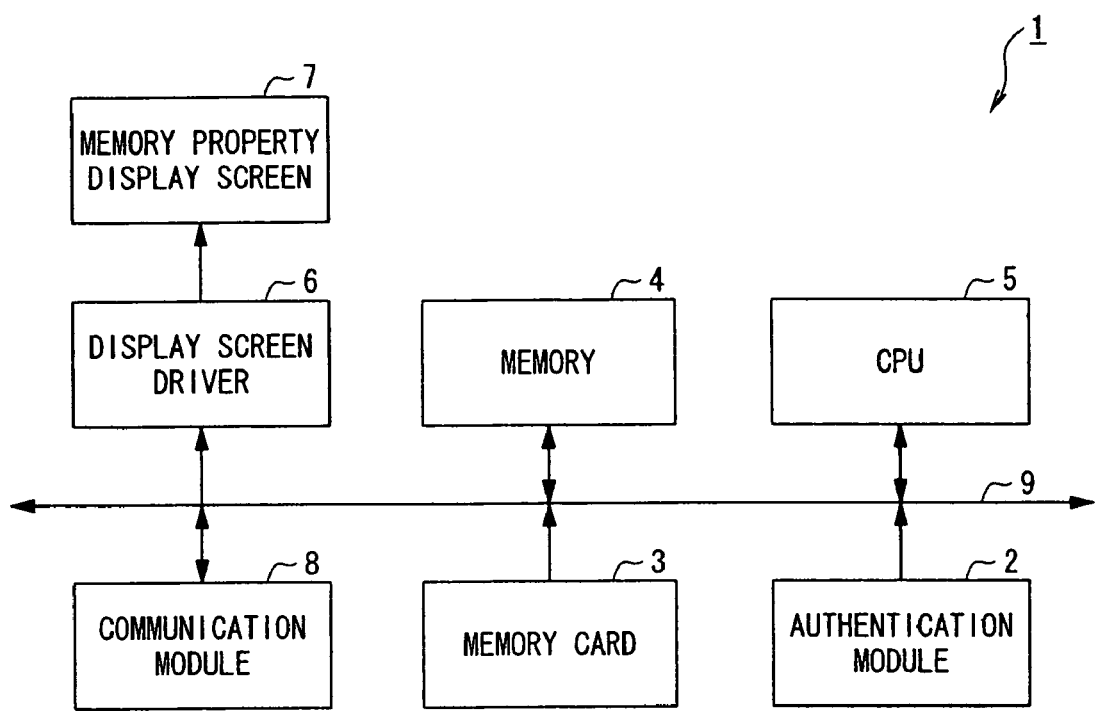
FIG. 1 is a block diagram showing one embodiment of the information display device of the present invention.

FIG. 1 is a block diagram showing an internal configuration of an information display device of the present embodiment. As shown in FIG. 1, the information display device 1 is configured by including an authentication module 2, a memory card 3, a memory 4, a CPU 5, a display screen driver 6, a memory property display screen 7, and a communication module 8. Each section except for the memory property display screen 7 is mutually connected to be able to give and receive data through a bus 9.

The authentication module 2 is a finger print detection device that specifies a user, and detects the characteristic portion of the finger print of a finger when the finger of the user is depressed, and outputs the detection result to the CPU 5.

The memory card 3 is configured by a non-volatile memory such as a flash memory and the like, and obtains the document data which is a display object from external equipment such as a personal computer and the like, and stores it.

The memory 4 is configured by a non-volatile memory such as a hard disk drive and the like, and stores various programs that control each portion 2 to 8 of the information display device 1. Further, the memory 4 prestores the data of the characteristic portion of the finger print of the user permitted to operate the information display device 1.

The CPU 5, according to the indicating operation of the user, reads the program stored in the memory 4, and executes various processings. The CPU 5, when the display operation of the document data is performed by the user, outputs an instruction to draw the document data corresponding to the display operation from among the document data stored in the memory card 3 on the memory property display screen 7 to the display screen driver 6.

Further, the CPU 5 includes a reauthentication timer that clocks on the elapsed time, and allows the reauthentication timer to start the clocking when the power supply to the information display device 1 is started. Further, the reauthentication time sets a clocking time (timer value) to "0" when a fixed time (for example, ten minutes) elapses, and clocks on again the elapsed time from the timer value of the "0".

Further, the CPU 5, when the power supply to the information display device 1 is started or after the document data is displayed in the memory property display screen 7, executes a user confirmation processing to be described later every time a fixed time elapses (timer value of the reauthentication timer reaches the fixed time). When this user confirmation processing is executed, the power source of the authentication module 2 is put into a turned ON state, and a command to detect the characteristic portion of the finger print of the user is outputted to the authentication module 2. When the user authentication is performed and the detection result matches the data of the characteristic portion of the finger print stored in the memory 4 (user authentication succeeds), the displayed content is maintained, and when they do not match (user authentication fails), a command to rewrite all the pixels of the memory property display screen 7 into a white color is outputted to the display screen driver 6.

The display screen driver 6, according to the command from the CPU 5, generates an image data to be drawn on the memory property display screen 7, and draws the generated drawing data on the memory property display screen 7.

The memory property display screen 7 is configured by a memory property display device (display device that continues to maintain the displayed content even when the power supply is shut off), and displays pixel data to the predetermined pixels according to the control of the display screen driver 6. Incidentally, as the memory property display screen 7, for example, an electrophoretic migration display, a cholesteric liquid crystal display, an electrode position display, and the like can be cited.

Operation of CPU

Figure 2:
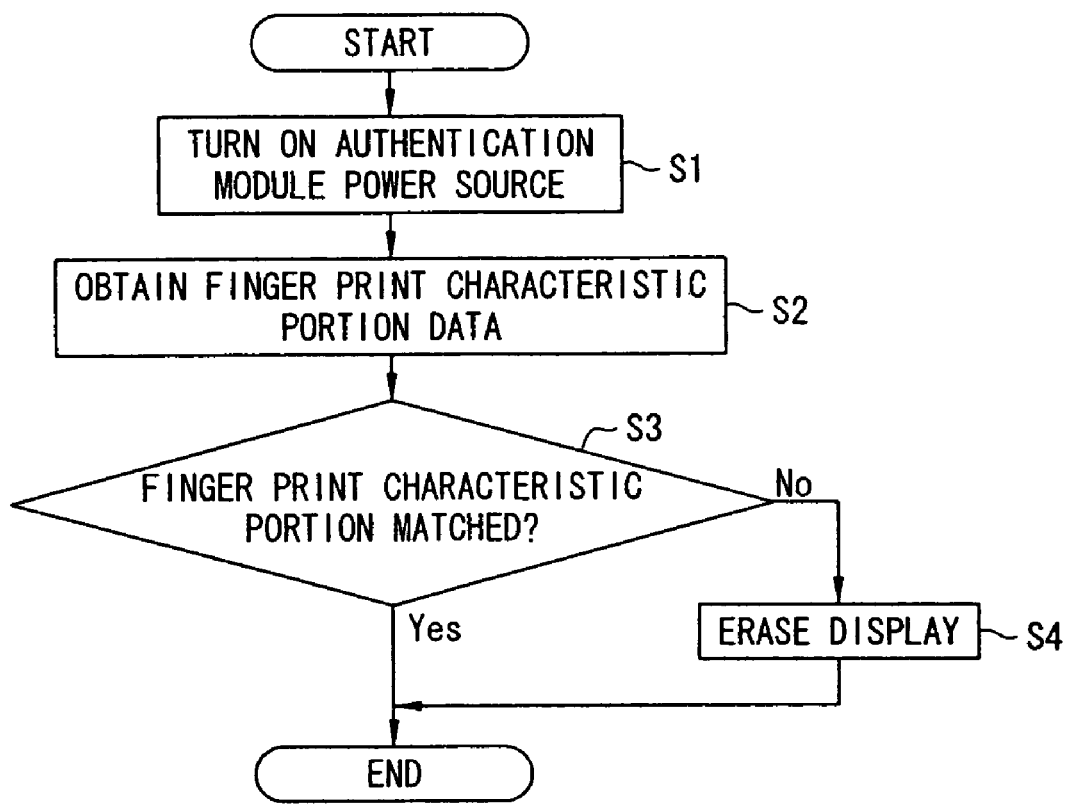
FIG. 2 is a flowchart showing user confirmation processing executed by a CPU.

Next, a user confirmation processing executed by the CPU 5 will be described based on the flowchart of FIG. 2. This user confirmation processing, when the power supply to the information display device 1 is started or after the document data is displayed in the memory property display screen 7, is a processing to be executed every time a predetermined time elapses. First, at step S1, the power source of the authentication module 2 is put into a turned ON state, and a message display command that allows a message to the effect that "please depress your finger on the authentication module" to be displayed in a part of the memory property display memory 7 is outputted to the display screen driver 6.

Next, the processing proceeds to step S2, and obtains the detection result outputted from the authentication module 2. Incidentally, at step S1, even if a predetermined time (for example, 30 seconds) elapses after the message display command is outputted, in case the detection result is not outputted from the authentication module 2, that is, in case the user does not depress his or her finger on the authentication module 2, the processing proceeds to the next step without doing anything.

Next, the processing proceeds to step S3, and performs a user authentication. Specifically, the processing determines whether the detection result obtained at step S2 matches the data of the characteristic portion of the finger print of the user permitted to operate the information display device 1 (data prestored in the memory 4). If matched (Yes, the user authentication succeeds), this calculation processing is terminated, and if not matched (No, the user authentication fails), the processing proceeds to step S4.

Incidentally, when the detection result of the authentication module 2 is not obtained at step S2, that is, even when the user does not depress his or her finger on the authentication module 2, the processing proceeds to step S4.

At step S4, after the displayed content erasing command to rewrite all the pixels of the memory property display screen 7 to the white color is outputted to the display screen driver 6, this calculation processing is terminated.

Specific Operation of Information Display Device

Next, the operation of the information display device 1 of the present embodiment will be described based on a specific situation.

First, presume that ten minutes has elapsed while the user displays the document data in the memory property display screen 7 and peruses it. Then, the user confirmation processing is executed by the CPU 5, and first, at step S1, the power source of the authentication module 2 is put into an ON state, and the message display command is outputted to the display screen driver 6. By the display screen driver 6, a message to the effect that "please depress your finger on the authentication module" is displayed in a portion of the memory property display screen 7.

Presume that the user (user permitted to operate the information display device 1) who read that message depresses his or her finger on the authentication module 2. Then, at step S2, the detection result outputted from the authentication module 2 is obtained, and the user authentication is performed, and the determination at step S3 becomes "Yes" (user authentication succeeds), and this calculation processing is terminated with the displayed content of the memory property display device 7 maintained as it is (without rewriting).

Figure 3:
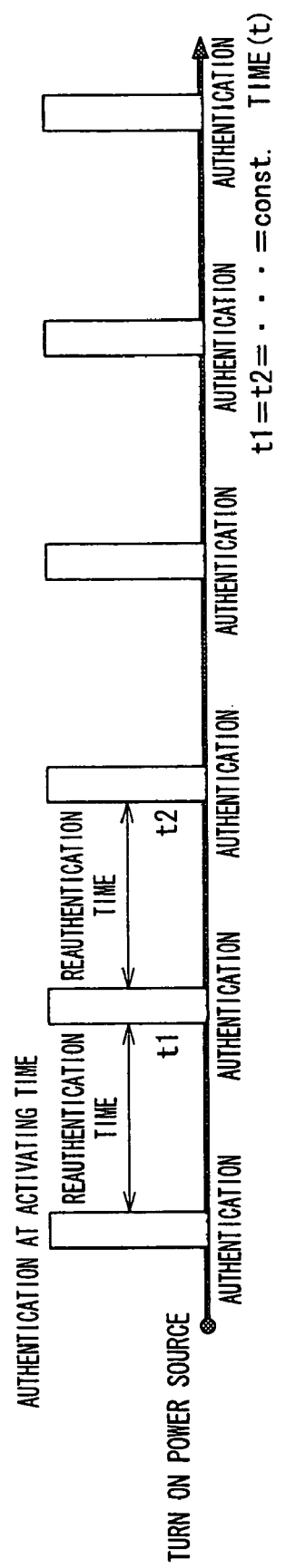
FIG. 3 is an explanatory drawing for explaining the operation of the information display device.

As shown in FIG. 3, every time ten minutes elapse, the flow is repeatedly executed from step S1, so that the user can continue to peruse the displayed content.

Further, presume that the user leaves the information display device 1 alone on the desk, while maintaining the document data displayed as it is, and the displayed content is perused by another user, and then, ten minutes elapses after the user confirmation processing is executed last time. Then, presume that the user confirmation processing is executed again, and going through steps S1 and S2, another user depresses his or her finger on the authentication module 2. Thereupon, the user authentication is performed, and the determination of step S3 becomes "No" (user authentication fails), and the displayed content erasing command is outputted to the display screen driver 6, and after that, this calculation processing is terminated. By the display screen driver 6, all the pixels of the memory property display screen 7 are rewritten to the white color, and the displayed content of the memory property display screen 7 is erased.

Thus, in the information display device 1 of the present embodiment, the user authentication is performed every fixed time elapses, and when the user authentication fails, the displayed content of the memory property display screen 7 is erased. Hence, in case the person (person not capable of succeeding in the user authentication) not permitted to use the information display device 1 peruses the information displayed in the memory property display screen 7, when the user authentication is performed, the user authentication fails, the displayed content of the memory property display screen 7 is erased, and as a result, the information kept displayed can be prevented from being perused easily by another person.

Incidentally, the information display device of the present invention is not limited to the content of the above described embodiment, but can be changed suitably in the range not deviating from the spirit and scope of the present invention.

Figure 4:
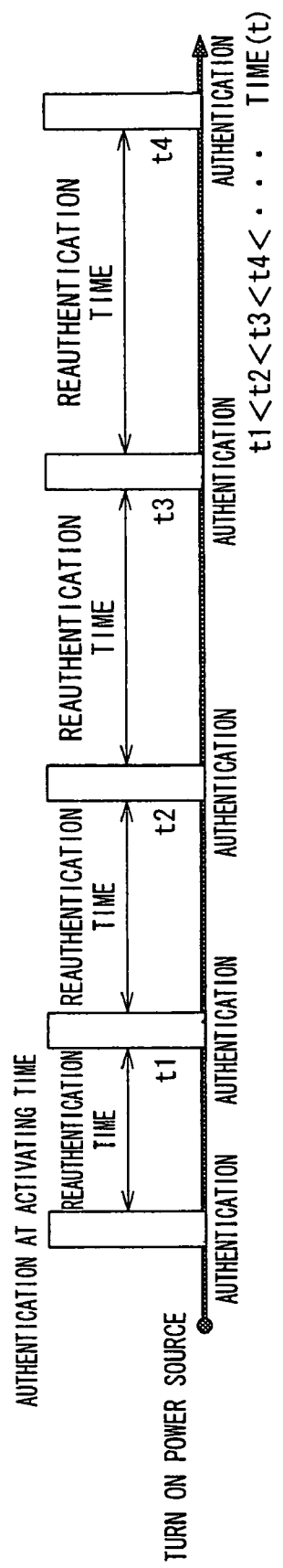
FIG. 4 is an explanatory drawing for explaining a modified example of the information display device of the present invention.

For example, while an example of fixing the time interval constant for performing the determination (user authentication) as to whether or not the user is permitted to operate the information display device 1 has been shown, it is not limited to this. For example, as shown in FIG. 4, every time the user is determined as a user who is permitted to operate the information display device 1 by the user authentication (every time the user authentication succeeds), the time interval until the next determination is performed may be extended. By so doing, by continuously using the information display device 1, the time interval can be extended, and the executing number of times of the user authentication can be reduced, for example, as compared with a method of fixing the time interval always constant, and the convenience of the user can be improved.

Figure 5:
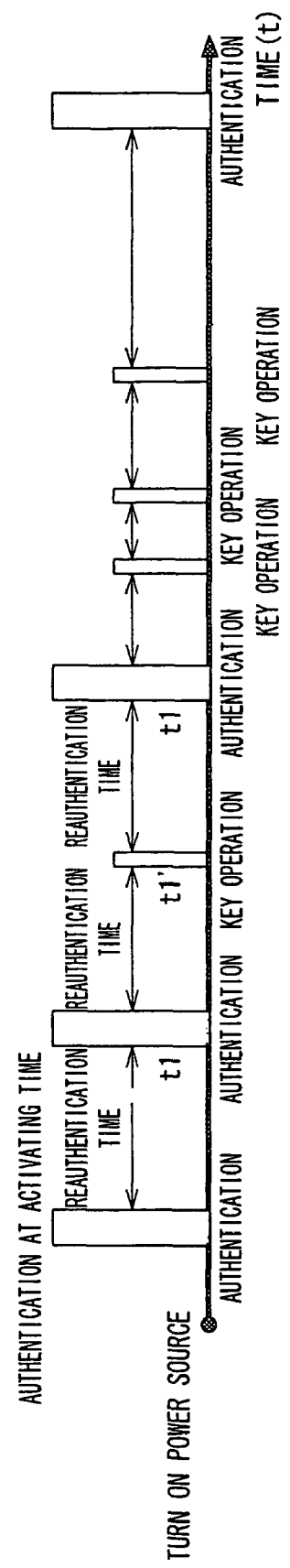
FIG. 5 is an explanatory drawing for explaining a modified example of the information display device of the present invention.

Further, as shown in FIG. 5, a determination may be performed after a fixed time elapses since when the information display device 1 is operated last time. That is, during the period until the next determination is performed, the timer value of the reauthentication time may be reset in case the input operation is performed. By so doing, during the information display device 1 is operated at a fixed frequency, an unintended operation to perform the user authentication can be prevented, and after the termination of the operation, the user authentication can be performed as quickly as possible.

Figure 6:
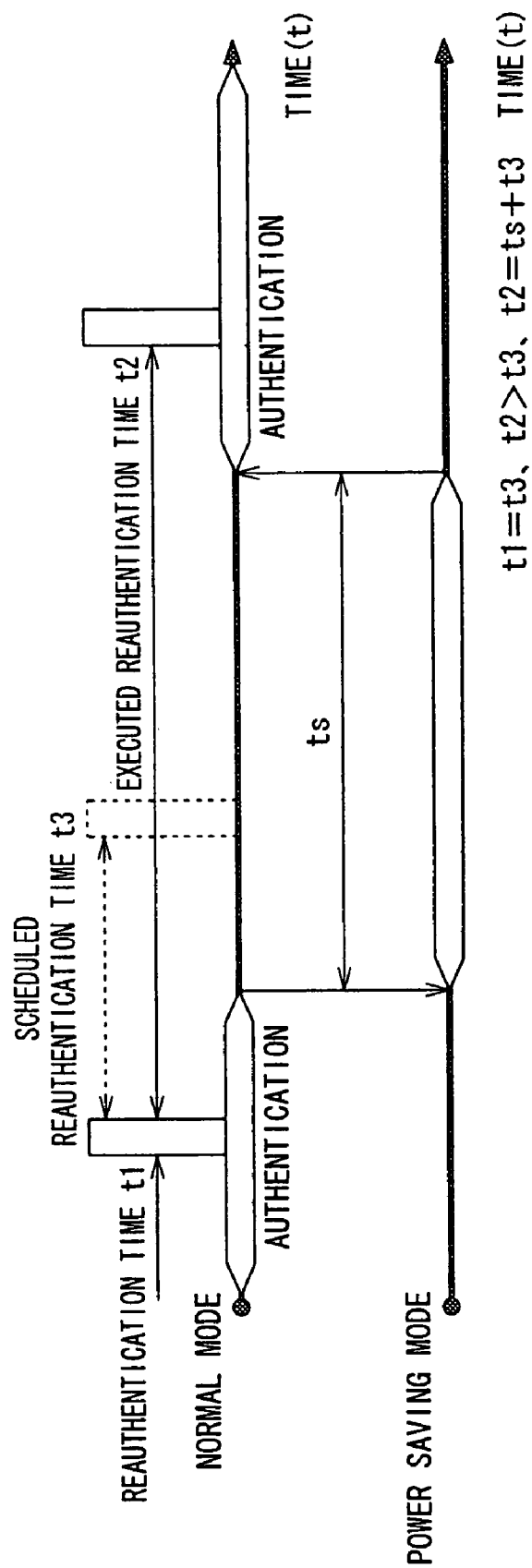
FIG. 6 is an explanatory drawing for explaining a modified example of the information display device of the present invention.

Further, every time the display of the document data to the memory property display screen 7 is terminated, the power supply to the information display device 1 may be shut off for power saving (the processing may proceed to a power saving mode). Incidentally, in case the processing is movable to the power saving mode, when moved to the power saving mode, the processing prohibits the user authentication at the starting time of the power supply to the information display device 1, and moreover, when the timer value of the reauthentication is allowed to be held by a non-volatile memory and the power supply to the information display device 1 is started again, clocking may be performed from the timer value held in the reauthentication timer. By so doing, as shown in FIG. 6, when the power saving mode is terminated in order to perform the rewriting of the displayed content and the power supply to the information display device 1 is restarted (returned to a normal mode), the user authentication can be prevented from being performed immediately, and every time the information display device 1 returns to the normal mode (rewriting is performed), the labor (labor of performing the user authentication) of depressing his or her finger to the authentication module 2 can be saved.

Further, the information display device 1 includes a timer that clocks on the elapsed time since moving to the power saving mode, which is a power saving timer that becomes "0" in the timer value every time a predetermined time elapses, and may allow the user confirmation processing to be executed by a circuit supplied with the power even when in a power saving mode every time the timer value of the power saving timer reaches the predetermined times. By so doing, as shown in FIGS. 7A and 7B, even during the power saving mode, every time the predetermined time elapses, the user authentication can be performed, and as a result, the displayed information can be prevented from being easily perused by others.

Further, if the user is determined to be not a user permitted to operate the information display device 1 by the user authentication (user authentication fails), the information display device 1 is put into a state in which the operation input to the information display device 1 is not accepted or the data of the information displayed in the memory property display screen 7 may be erased.

Further, by keeping the records of the user names and the display data when the user authentication is performed, an access history that can indicate when and by who the highly confidential document data and the like has been perused may be prepared. By so doing, in the management of the confidential documents and personal information, even when keeping the records of the history of access to these pieces of information becomes obligatory, the situation can be coped with easily.

What is claimed is:

1. An information display device displaying information on a memory display screen, comprising:
    a user authentication executing section performing user authentication at predetermined time intervals;
    an elapsed time clocking section clocking an elapsed time from a time when a last user authentication is performed by the user authentication executing section until each predetermined time interval elapses; and
    a display screen control section prohibiting an unauthorized user from perusing the information displayed on the memory display screen after the user authentication performed by the user authentication executing section fails,
    wherein the user authentication executing section repeatedly performs the user authentication, even after the user authentication by the user authentication executing section succeeds, every time the elapsed time clocked by the elapsed time clocking section reaches the predetermined time interval, and
    wherein the user authentication executing section extends the predetermined time interval every time the user authentication succeeds.

* * * * *